Figure 1:
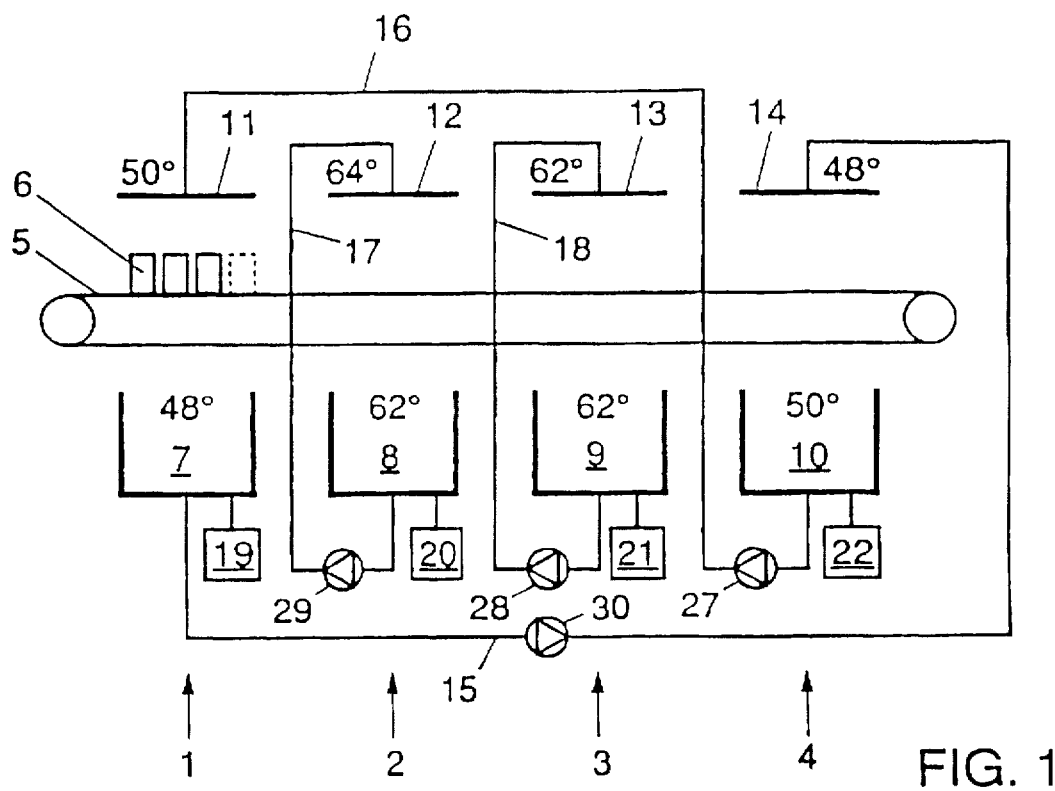

United States Patent [19]
Lucassen

[11] Patent Number: 5,750,174
[45] Date of Patent: May 12, 1998

[54] PROCESS AND APPARATUS FOR PASTEURIZING LIQUID CONTAINED IN CONTAINERS

[75] Inventor: Ronald Lucassen, Schijndel, Netherlands

[73] Assignee: Heineken Technical Services B.V., Amsterdam, Netherlands

[21] Appl. No.: 525,577

[22] PCT Filed: Mar. 4, 1994

[86] PCT No.: PCT/NL94/00054

§ 371 Date: Aug. 30, 1995

§ 102(e) Date: Aug. 30, 1995

[87] PCT Pub. No.: WO94/19968

PCT Pub. Date: Sep. 15, 1994

[30] Foreign Application Priority Data

Mar. 5, 1993 [NL] Netherlands .................... 9300404

[51] Int. Cl.⁶ .................................................... A23L 3/00
[52] U.S. Cl. ........................ 426/521; 99/470; 422/38; 426/407
[58] Field of Search .......................... 426/521, 407; 99/470; 422/38, 304

[56] References Cited

U.S. PATENT DOCUMENTS

| | | | |
|---|---|---|---|
| 4,704,958 | 11/1987 | Braymand | 99/470 |
| 4,849,235 | 7/1989 | Braymand | 426/232 |
| 4,992,247 | 2/1991 | Foti | 426/521 |
| 5,012,727 | 5/1991 | Pesente | 99/470 |
| 5,310,566 | 5/1994 | Baudendistel | 426/521 |

FOREIGN PATENT DOCUMENTS

| | | |
|---|---|---|
| 0 204 138 A1 | 12/1986 | European Pat. Off. . |
| 0 239 708 A1 | 10/1987 | European Pat. Off. . |
| 0 430 907 A3 | 6/1991 | European Pat. Off. . |
| 2 182 542 | 5/1987 | United Kingdom . |
| WO 90/03806 | 4/1990 | WIPO . |
| WO 91/15128 | 10/1991 | WIPO . |

*Primary Examiner*—George Yeung
*Attorney, Agent, or Firm*—Pearne, Gordon, McCoy & Granger LLP

[57] ABSTRACT

The invention relates to a process for the pasteurization of liquid contained in containers, such as beer in bottles or cans, in a tunnel pasteurizer comprising at least a pre-heating zone (1), a pre-pasteurization zone (2), a pasteurization zone (3) and a cooling zone (4), each zone comprising a plurality of sprayers (11, 12, 13, 14), containers being heated up and cooled down through spraying with water which is received in a plurality of separate receiving means (7, 8, 9, 10), the containers in a cooling zone being sprayed with water received in a pre-heating zone. The process is characterized in that during the normal, continuous feed-through of the containers through the pasteurizer, the supply of water to the sprayers in the pasteurization zone is prevented.

16 Claims, 2 Drawing Sheets

PROCESS AND APPARATUS FOR PASTEURIZING LIQUID CONTAINED IN CONTAINERS

The invention relates to a process for the pasteurization of liquid contained in containers, such as beer in bottles or cans, in a tunnel pasteurizer comprising at least a pre-heating zone, a pre-pasteurization zone, a pasteurization zone and a cooling zone, each zone comprising a plurality of sprayers, containers being heated up and cooled down through spraying with water received in a plurality of separate receiving means, the containers in a cooling zone being sprayed with water received in a pre-heating zone. The invention also relates to a tunnel pasteurizer for carrying out such process.

A process as described in the preceding paragraph is disclosed in EP-A2-0 430 907, wherein liquid contained in containers, such as beer in bottles or cans, is passed through a tunnel pasteurizer at constant speed, and pasteurized therein through heating up the containers and cooling them down again by means of spraying with water.

During a normal, continuous feed-through of containers, the liquid in the containers is first heated up in the pre-heating area to near the pasteurization temperature and is subsequently heated in the pre-pasteurization zone to the pasteurization temperature by spraying the containers with water received in that zone, which is heated up again to a temperature higher than the pasteurization temperature. In the pasteurization zone, the containers are sprayed with water recirculated in that zone, which water is maintained at a suitable pasteurization temperature. After having passed through the pasteurization zone, the containers are cooled again in the cooling area, the containers in the first cooling zone being sprayed with water received in the last pre-heating zone. The water received in the first cooling zone, which was used as spray water and has hence withdrawn heat from the containers, is in turn fed back again to the last pre-heating zone.

The known process has as a drawback that in particular starting up or, after a failure, restarting the pasteurization, requires much energy, while, moreover, during a failure in the feed-through of containers through the pasteurizer, much energy is lost. In addition, during the pasteurization, the normal, continuous feed-through of the containers requires much energy for pumping round the spray water and bringing it to a temperature and maintaining it at that temperature.

The object of the invention is to reduce the consumption of (cooling) water and energy in a process of the type described in the preamble while maintaining the good pasteurization properties of the known process.

To that end, according to the invention, it is proposed that during the normal, continuous feed-through of the containers through the pasteurizer, the supply of water to the sprayers in the pasteurization zone is prevented.

The measure proposed in accordance with the invention is primarily based on the insight that during the normal, continuous feed-through, the temperature of the containers and the liquid contained therein, after a suitable heating in the pre-pasteurization zone, remains sufficiently high in the pasteurization zone for pasteurization, even without spraying with water which has in fact the same temperature as the containers and in particular the liquid contained therein. This is due to the close packing of the containers, the low heat transfer between air and glass, tinplate and similar materials, and a suitable degree of air humidity and air temperature in the pasteurization zone.

As in the process according to the invention, spraying in the pasteurization zone can be omitted during the normal feed-through of the containers, less energy is required for heating up spray water than in the known process.

In terms of control engineering, this operating procedure has the further advantage that the liquid can leave the pre-pasteurization zone with an optimally adjustable pasteurization value by influencing only the temperature in the pre-pasteurization zone, because no spraying takes place in the pasteurization zone anymore.

Usually, the pasteurization value of the liquid contained in the containers is expressed in PUs, and is a function of the pasteurization temperature and the dwell period of the liquid, and hence in the given case the containers, in the zone(s) having the given temperatures. Hence, optimization of the pasteurization value can in principle be achieved by influencing on the one hand the temperature, and on the other the dwell period of the containers in the zone(s) wherein that temperature prevails.

Usually, the feed-through speed, and accordingly the dwell period of the containers in the different zones, as well as the temperatures prevailing in the different zones, are adjusted to each other so as to obtain an optimum pasteurization temperature, the various pasteurization values of the liquid in different containers being within a range of a relatively small differential.

One of the major advantages of non-spraying in the pasteurization zone during the normal, continuous feed-through can be gained during a failure and at the start-up after a failure in the feed-through of containers through the pasteurizer.

When the feed-through of the containers is disturbed, and the containers are passed through the pasteurizer in a delayed manner, or come to a halt therein, the temperature of the containers and the liquid contained therein will gradually rise such that a chance of over-pasteurization occurs. To prevent this, in the known process, the temperature of the spray water in the pre-pasteurization zone and the pasteurization zone should therefore be lowered some time after the occurrence of the failure. For this purpose, cold water is added to the spray water. As a result, much heat is lost because the receiving means will flow over, and because warm water is being cooled which, if the failure in the feed-through is eliminated, must be heated up again. Further, the addition of cold water means a relatively rough interference with the pasteurization process, as a result of which the distribution in pasteurization values of the various containers, or at least the liquid-contained therein, becomes comparatively substantial, while, moreover, after elimination of the failure additional measures are necessary to prevent under-pasteurization.

If no spraying takes place in the pasteurization zone during normal feed-through, as is proposed above in accordance with the invention, a cooling, if desired, can be carried out in a considerably energy-saving manner during a disturbance in the feed-through, if, in accordance with a further embodiment of the invention, during a delayed feed-through or standstill of the containers in the pasteurization zone, spraying takes place with water received in a cooling zone.

Through these measures, imminent over-pasteurization can be prevented in a simple yet effective manner. After all, the temperature of the water received in the above-mentioned cooling zone is lower than the temperature of the containers and the liquid contained therein in the pasteurization zone, which prevents the necessity of an external supply of cold water. Moreover, when the normal feed-through of the containers is restarted through the optimum resetting of the pasteurization temperature in the pre-pasteurization zone, it will be possible to set the optimum pasteurization value of the liquid and containers, without the temperature of the water in the pasteurization zone having to be raised for that purpose. After all, in accordance with the invention, no spraying takes place in the pasteurization zone during the normal feed-through of the containers. In this manner, the normal pasteurization process can quickly be resumed without any danger of under-pasteurization.

As has already been indicated hereinabove, in the known process, the containers are passed through the pasteurizer at a fixed, constant speed, and consequently, the dwell period of the containers in the different zones is fixed. The temperatures prevailing in the different zones are adjusted thereto so as to obtain an optimum pasteurization value.

This coupling has as a drawback that the capacity of the devices connected upstream and downstream of the pasteurizer, such as, for instance, filling and labelling machines, should be adjusted to the feed-through speed of the pasteurizer, or that the entire line will have no optimum degree of capacity utilization. When the capacity of the pasteurizer is too high, the pasteurizer will have to be temporarily stopped each time, or run unloaded. In both cases, a substantial loss of energy will occur. When, on the other hand, the capacity of the pasteurizer is too small, the further device will have no optimum capacity utilization and the chance of under-pasteurization becomes considerable. Moreover, energy is lost due to disturbances in the energy balance.

In order to remove these drawbacks, in the process of the invention the feed-through speed of the containers through the pasteurizer and the temperature of the spray water in at least the pre-pasteurization zone can be controlled via a temperature-time model, in such a manner that when leaving pre-pasteurization zone, the liquid and the containers have an optimum pasteurization value. These measures, offering special advantages, are possible partly because, due to the fact that no spraying takes place in the pasteurization zone during normal feed-through, the regulation of the pasteurization value mainly takes place in the pre-pasteurization zone, as a result of which a regulation in the case of variable feed-through should mainly be set and carried out in the pre-pasteurization zone only.

Moreover, in the case of a disturbed feed-through of the containers through the pasteurizer, this regulation enables a quick temperature reduction in the pre-pasteurization zone without involving the chance of under-pasteurization, as the relatively cool containers, carried from the pre-heating zone to the pre-pasteurization zone, will cool the containers which have already been present in the pre-pasteurization zone for a longer period, causing the average temperature of the containers to be quickly brought below the pasteurization temperature.

It is particularly advantageous when during the normal feed-through of containers through the pasteurizer the temperature of the water in the receiving means in the pasteurization zone is at least kept equal to the temperature of the water in the first cooling zone. This ensures in a simple, automatic manner that the air temperature and humidity in the pasteurization zone are maintained at the proper value, as a result of which the containers in the pasteurization zone are safely kept at the proper temperature and under-pasteurization or over-pasteurization is prevented.

Moreover, in this manner, a large reservoir of water is obtained having a temperature such that containers can both be pre-heated thereby in the pre-heating zone and cooled in the zones located downstream of the pre-pasteurization zone, as desired, so that it becomes possible to cool without supplying cold water, as a result of which comparatively very little energy is lost.

In this connection, it is particularly advantageous when in the process of the invention, during normal feed-through of containers through the pasteurizer, the water received in a cooling zone is directly conducted to the sprayers in a pre-heating zone via the receiving means in the pasteurization zone.

Moreover, the object of the invention is to provide a tunnel pasteurizer for carrying out the process according to the invention, which tunnel pasteurizer is of a simple construction, permits a relatively low energy consumption and can for instance be obtained through a simple adaptation of existing tunnel pasteurizers.

For this purpose, a tunnel pasteurizer comprising at least a pre-heating zone, a pre-pasteurization zone, a pasteurization zone and a cooling zone, each comprising a plurality of sprayers, there being provided in each zone receiving means for receiving water coming from the sprayers, conveying means being arranged for feeding through, under the sprayers and above the receiving means, the containers filled with liquid to be pasteurized, and means being arranged for the heating of water, is characterized in that the sprayers in a pre-heating zone are connected, via conduits, to the receiving means in the pasteurization zone.

These measures enable an existing, known pasteurizer to be adapted in a simple manner and at relatively low costs for using a process according to the invention, wherein in a pre-heating zone spraying can take place with water coming from the pasteurization zone.

In this connection, it is particularly advantageous when, in accordance with the invention, switch means are arranged capable of connecting, during a normal feed-through of containers through the pasteurizer, the receiving means in the cooling zone to the receiving means in the pasteurization zone, and of connecting, during a disturbed feed-through of containers through the pasteurizer, the receiving means in a cooling zone to the sprayers in the pasteurization zone.

As a result, during a normal feed-through of the containers through the pasteurizer, spraying in the pasteurization zone can be prevented, so that the energy consumption is kept low, while-during a disturbed feed-through, spraying in the pasteurization zone can take place with water from a cooling zone.

In an alternative embodiment of the pasteurizer according to the invention, the receiving means in the pasteurization zone and the receiving means in the first cooling zone are formed by one receptacle.

Preferably, the pasteurizer according to the invention comprises registration and control means for registering the feed-through of containers through the tunnel pasteurizer and at least the temperature in the tunnel pasteurizer, and for controlling, on the basis thereof, the switch means. This allows a simple and automatic monitoring and regulation of the operation of the tunnel pasteurizer.

In this respect, it is particularly advantageous when the pasteurizer according to the invention comprises a regulating device for regulating, according to a model, the feed-through speed of the containers through the pasteurizer and the temperature of the water in at least the pre-pasteurization zone, the arrangement being such that when leaving the pre-pasteurization zone, the containers and the liquid have a predetermined pasteurization value.

Figure 2:
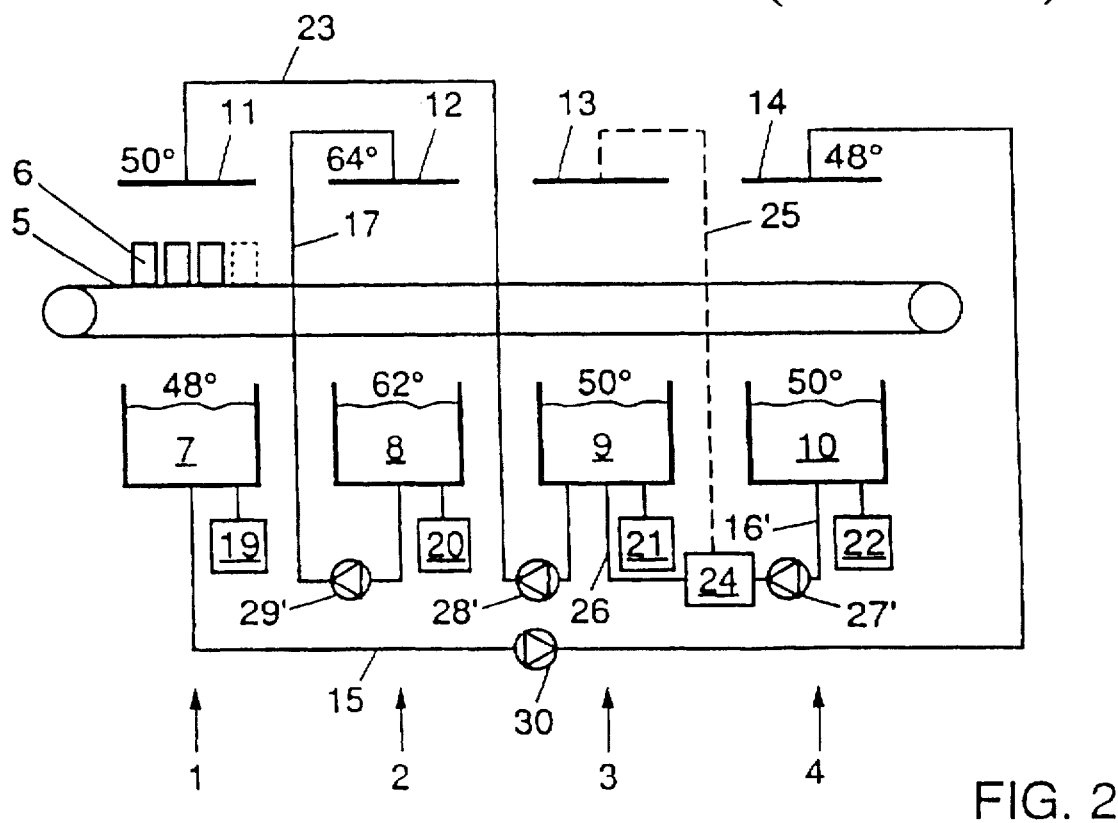
Figure 3:
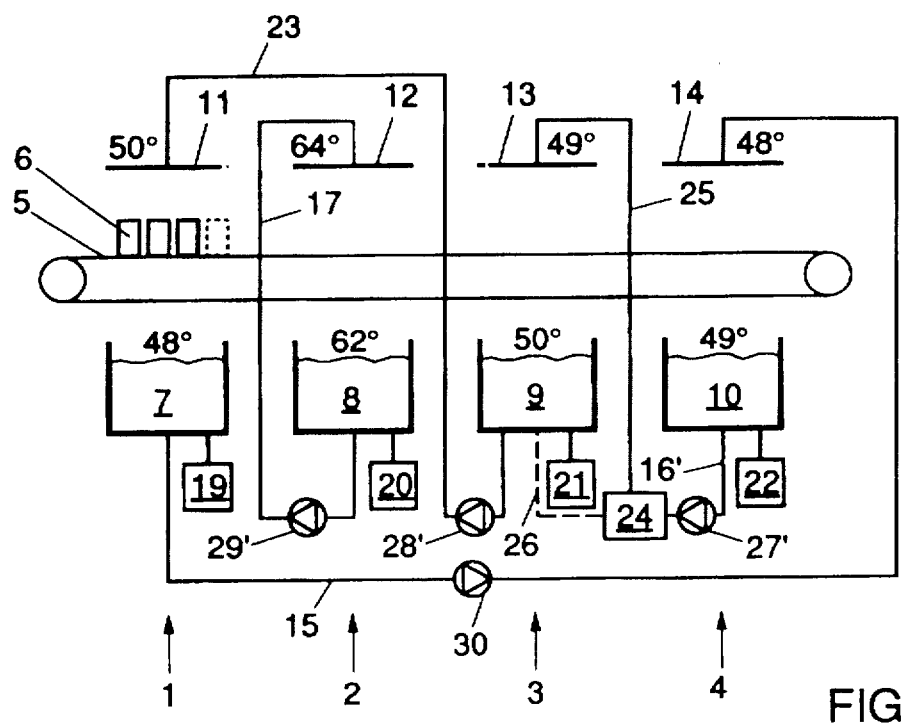
Figure 4:
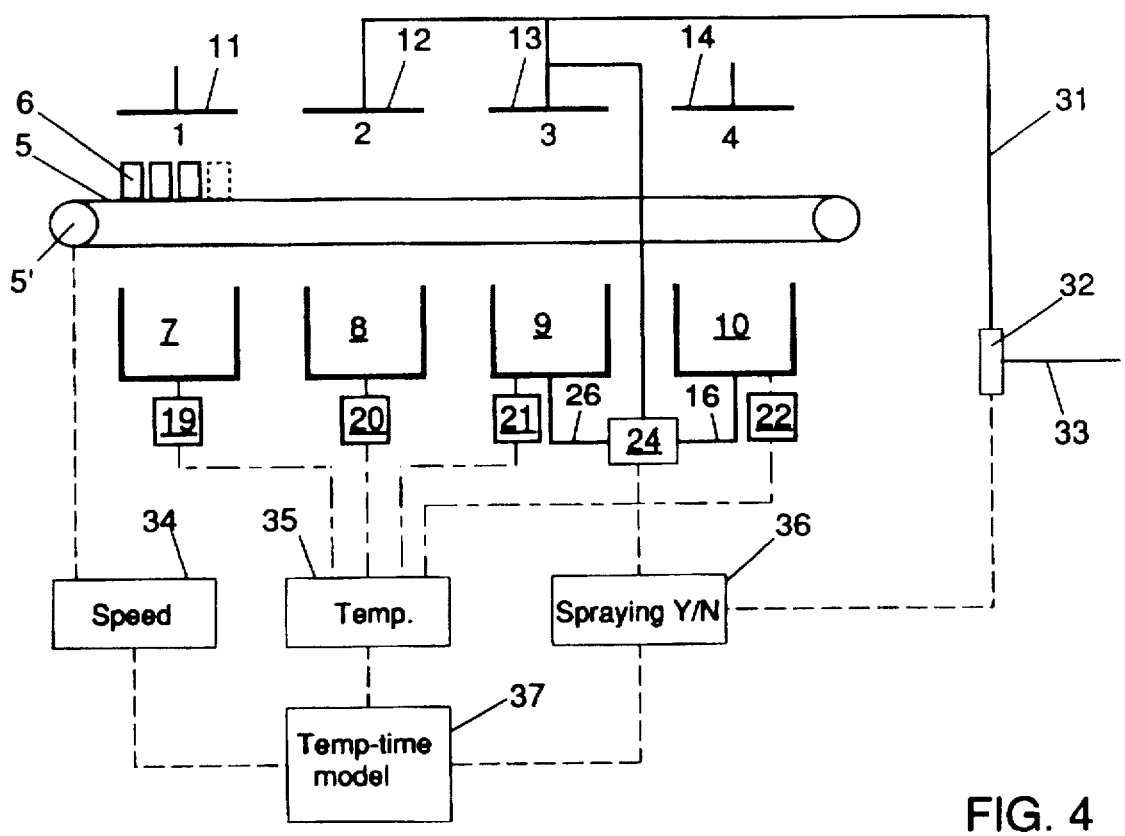

To explain the invention, practical examples of the process according to the invention and associated tunnel pasteurizers will be described hereinafter, with reference to the accompanying drawings. In these drawings:

FIG. 1 schematically shows a known pasteurizer;

FIG. 2 schematically shows a tunnel pasteurizer according to the invention using the process according to the invention, where the containers are fed through the pasteurizer in a normal manner;

FIG. 3 schematically shows a tunnel pasteurizer according to the invention using the process according to the invention, where the feed-through of the containers through the pasteurizer is disturbed or stopped; and FIG. 4 is a schematic representation of an alternative embodiment of the pasteurizer according to the invention.

A known pasteurizer, as shown in FIG. 1, comprises at least a pre-heating zone 1, a pre-pasteurization zone 2, a pasteurization zone 3 and a cooling zone 4. A conveyor belt 5 extends through the tunnel pasteurizer through the four zones 1, 2, 3 and 4, for feeding containers 6, filled with liquid to be pasteurized, through the pasteurizer. Each zone 1, 2, 3 and 4 comprises a receptacle 7, 8, 9, 10, disposed under the conveyor belt 5. Moreover, in each zone 1, 2, 3, 4, a plurality of sprayers 11, 12, 13, 14 have been arranged above the conveyor belt 5, such that the containers 6 can be advanced under the sprayers 11, 12, 13, 14 and sprayed with water coming from the sprayers 11, 12, 13, 14, which water is subsequently collected in the receptacles.

The temperatures shown in the drawing only serve as an example and are conventional for pasteurizing beer in containers. However, these temperatures may be adjusted, depending on, for instance, the liquid and containers to be pasteurized.

When containers filled with liquid are pasteurized by means of the known pasteurizer, the filled containers are carried by means of the conveyor belt 5 from, for instance, a filling device, not shown, into the pre-heating zone 1, and from that location they are carried further through the pasteurizer. In the pre-heating zone, the containers 6 are sprayed with water having a temperature such that the containers in the pre-heating zone 1 are heated to slightly below the pasteurization temperature. The water whose temperature has slightly decreased during spraying, due to the heat exchange with the containers, is received in the receptacle 7.

From the pre-heating zone 1, the containers 6 are carried into the pre-pasteurization zone 2, and sprayed with water having a temperature such that through heat exchange with the spray water, the containers 6 and the liquid are heated to the pasteurization temperature. In the pre-pasteurization zone 2, the spray water is received in the receptacle 8 and brought to the desired temperature again by means of a steam-heated heat exchanger 20, after which it is directly supplied again, by means of a pump 29 and via the conduit 17, to the sprayers 12 in the pre-pasteurization zone. In other words, in the pre-pasteurization zone 2 the spray water is recirculated.

After the containers 6 and the liquid have been heated to the pasteurization temperature, the containers are carried into the pasteurization zone 3, where they are sprayed with water having a temperature such that the containers maintain the temperature obtained in the pre-pasteurization zone 2. For that purpose, the spray water in the pasteurization zone is recirculated by means of the receptacle 9, the conduit 18 which contains the pump 28, and the sprayers 13, the water being continuously maintained at the same temperature, if necessary through a heat exchanger 21. Therefore, in the known process, no actual heat exchange takes place between the spray water and the containers 6 in the pasteurization zone 3.

From the pasteurization zone 3, the containers are passed through the cooling zone 4, wherein the containers are sprayed with water which is conducted, by means of the pump 30 and via a feed line 15, from the receptacle 7 in the pre-heating zone 1 to the sprayers 14 in the cooling zone 4 and, if necessary, brought to the proper temperature by means of a heat exchanger 19. As the water received in the pre-heating zone 1 has a clearly lower temperature than the containers 6 which are carried from the pasteurization zone 3 into the cooling zone 4, the containers 6 will be cooled through heat exchange with the colder spray water. The water warmed up through the heat exchange in the cooling zone 4 is received in the receptacle 10, and from there it is conducted, if necessary after further heating through a heat exchanger 22, to the sprayers 11 in the pre-heating zone by means of the pump 27 and via the return line 16, after which it can be used in the pre-heating zone 1 as spray water.

When the feed-through of the containers 6 through the pasteurizer is disturbed, the temperature of the containers and the liquid will rapidly increase, particularly in the pre-pasteurization zone 2, causing a considerable chance of over-pasteurization. As the water which is sprayed with in the pasteurization zone 3 has a relatively high temperature, the chance of over-pasteurization will even increase.

Therefore, to prevent over-pasteurization, in the known process, in the event of a disturbed feed-through, cold water coming from outside the pasteurizer is mixed with the spray water in the pre-pasteurization zone 2 and the pasteurization zone 3 after a short period, so as to reduce the temperature of the spray water.

When the feed-through of the containers becomes normal again, the spray water in the pre-pasteurization zone 2 and pasteurization zone 3, mixed with the cold water, will have to be warmed up again, which requires much extra energy, while the time needed for bringing the spray water to the desired temperature again involves a danger of under-pasteurization. Moreover, the known process has as a drawback that the addition of cold water only permits a very rough action, causing substantial differences in the PU values of the different containers during and some time after the occurrence of the failure in the feed-through of the containers.

To avoid the above-mentioned drawbacks, in the process according to the invention, no spraying takes place in the pasteurization zone, as is shown in FIGS. 2 and 3. This process can be performed by means of a pasteurizer according to the invention, which can be obtained in a simple manner through adaptation of the above-described known pasteurizer.

In the pasteurizer according to the invention, the receptacle 9 in the pasteurization zone 3 is connected by means of a conduit 23 to the sprayers 11 in the pre-heating zone 1. The receptacle 10 in the cooling zone 4 is connected by means of a conduit 16' to a controlled three-way valve 24, connecting in a first position the conduit 16' to the receptacle 9 in the pasteurization zone 3 by means of a conduit 26 (FIG. 2) or in a second position to the sprayers 13 in the pasteurization zone by means of a conduit 25 (FIG. 3).

If, by means of the conveyor belt 5, the containers 6 are continuously passed through the pasteurizer at a desired, normal, continuous feed-through speed, the three-way valve 24 is switched in the first position, allowing water to be pumped by the pump 27' directly from the receptacle 10 in the cooling zone 4 to the receptacle 9 in the pasteurization zone 3. Consequently, this does not involve water being conducted to the sprayers 13 in the pasteurization zone 3.

On the other hand, if, by means of the conveyor belt 5, the containers 6 are not passed through the pasteurizer at the desired, normal feed-through speed, for instance due to obstruction of the delivery of the containers 6 from the pasteurizer, the three-way valve 24 is switched into the second position after a specific period, allowing water to be pumped by the pump 27' directly from the receptacle 10 in the cooling zone 4 to the sprayers 13 in the pasteurization zone 3. This allows the containers in the pasteurization zone 3 to be sprayed with relatively cold water which is received in the cooling zone 4.

Because in the case of normal feed-through of the containers through the pasteurizer, the receptacles 9 and 10 are interconnected through the conduits 16' and 26, and the water is pumped by means of a pump 28' from the receptacle 9 to the sprayers 11 in the pre-heating zone 1, and is received again in that zone after spraying, a large reservoir is formed in the joint receptacles 7, 9 and 10 in the pre-heating zone 1, the pasteurization zone 3 and the cooling zone 4 respectively, which reservoir is filled with water having a temperature lower than the pasteurization temperature. This creates the possibility of cooling, as soon as is desired, in at least the pasteurization zone 3 in the event of a disturbed feed-through of the containers through the pasteurizer, while at the same time it remains possible to spray the containers in the pre-heating zone 1 with relatively warm water compared with the temperature of the containers 6 fed into that zone 1.

FIG. 4 schematically shows the pasteurizer according to the invention in an alternative embodiment, comprising a regulating device, including means for registering the temperature and the feed-through speed of the containers in at least the pre-pasteurization zone, and for switching the three-way valve 24 on the basis thereof, and further including means for measuring and regulating the temperature of the water in the different zones.

In a control unit 37, for instance a computer, a time-temperature-model is included, wherein for instance the speed at which the containers 6 are to be fed through the pasteurizer by means of the conveyor belt 5 can be input, so as to obtain an optimum capacity utilization of the machines connected upstream and downstream of the pasteurizer. By means of the speed control 34 and the drive unit 5', the speed of the conveyor belt 5 can be constantly controlled. Subsequently, on the basis of the time-temperature model, it is determined how the temperature in the different zones should be, in particular in the pre-pasteurization zone 2, so as to obtain an optimum pasteurization value of the containers 6 and the liquid contained therein at the speed set.

By means of the temperature regulator 35, the different heating devices 19–22 can be operated, so as to control the water temperature in the different zones 1–4. The operation of the pasteurizer can be optimized at different feed-through speeds in particular through the setting of the temperature of the spray water in the pre-pasteurization zone 3, by means of the heating device 20 on the basis of the time-temperature model.

In the event of a failure in the feed-through of the containers 6, the change is transmitted to the central control unit 37 by the speed regulator 34, allowing the settings of the different heating devices 19–22 to be adapted on the basis of the inputted time-temperature model.

Moreover, when the measured temperatures of the containers in the pasteurizer run too high, the three-way valve 24 is energized by the switch means 36, so that it is brought into the second position. As a result, water is conducted from the receptacle 10 to the sprayers 13 in the pasteurization zone 3, allowing the containers 6 to be cooled in that zone 3. Moreover, the temperature of the spray water in the pre-pasteurization zone 2 can simply be influenced through the partial or complete turning off of the steam supply in the heat exchanger 20.

If the feed-through through the pasteurizer is disturbed long enough for the temperature of the water in the receptacles 7, 9 and/or 10 to run too high, the tap 32 will be energized by the switch means 36, allowing a small amount of cold water to be conducted, via the conduit 31, from a cold water line 33 to the sprayers 13 in the pasteurization zone 3 and/or the pre-pasteurization zone 2 to provide extra cooling.

When the failure of the feed-through of the containers through the pasteurizer is eliminated, the regulating device will switch the pasteurizer back into the, starting position, i.e. the spraying in the pasteurization zone will be stopped by switching the three-way valve 24 back into the first position, and the cold water tap 32, which may have been open, will be closed. Moreover, through the temperature regulator 35 and on the basis of the time-temperature model, the spray water temperature in the pre-pasteurization zone 2 will be increased such that the ideal pasteurization value is attained again almost directly.

As the spraying in the pasteurization zone 3 is stopped when the normal feed-through of containers through the pasteurizer is restored, under-pasteurization after the restart of the pasteurizer is prevented in a simple manner, as the relatively cold water in the receptacles 7, 9 and 10 can be heated up to temperature without having to be used for spraying in the pasteurization zone, as is, the case in the known process.

It is observed that within the scope of the invention, other connections between the different receptacles and sprayers are possible as well, and that more zones than the four zones mentioned may be included in the pasteurizer. It is essential that the process according to the invention optimally utilizes temperature differences between the amounts of spray water used and received in the different zones, and that the pasteurization value can be optimized in particular through temperature control of the spray water in the pre-pasteurization zone, in the case of constant as well as variable feed-through speed of the containers through the pasteurizer, because at least during normal feed-through of the containers, no spraying takes place in the pasteurization zone.

Further, in the pasteurizer according to the invention, the receiving means in the pasteurization zone and the first cooling zone may together be constructed as one receptacle, a valve being arranged in such a manner that water can selectively be conducted from the receptacle to the sprayers in the cooling zone, to the pasteurization zone, to both zones mentioned or to neither of them, depending on the need for cooling in the respective zones.

Moreover, in this connection, means may be provided for returning water received in the pre-heating zone to either the receptacle in the pasteurization and cooling zone or to the sprayers in the cooling zone, as desired.

What is claimed is:

1. A process for the pasteurization of liquid contained in containers in a tunnel pasteurizer comprising at least a pre-heating zone, a pre-pasteurization zone, a pasteurization zone and a cooling zone, each zone comprising a plurality of sprayers, comprising heating and cooling the containers through spraying with water received in a plurality of separate receiving means, spraying the containers in the cooling zone with water received from the pre-heating zone, and, during a normal, continuous feeding of the containers through the pasteurizer, preventing the supply of water to the sprayers in the pasteurization zone.

2. A process according to claim 1, wherein during a delayed feed-through or standstill of the containers in the pasteurization zone, spraying takes place with water received from the cooling zone.

3. A process according to claim 1, wherein the feed-through speed of the containers through the pasteurizer and the temperature of the spray water in at least the pre-pasteurization zone are regulated by means of a temperature-time model, in such a manner that when leaving the pre-pasteurization zone, the liquid and the containers have an optimum pasteurization value.

4. A process according to claim 1, wherein during the normal feed-through of containers through the pasteurizer, the temperature of the water in the receiving means in the pasteurization zone is at least kept equal to the temperature of the water in the cooling zone.

5. A process according to claim 4, wherein during the normal feed-through of containers through the pasteurizer, the water received from the cooling zone is directly conducted to the sprayers in the pre-heating zone via the receiving means in the pasteurization zone.

6. A process according to claim 2, wherein the feed-through speed of the containers through the pasteurizer and the temperature of the spray water in at least the pre-pasteurization zone are regulated by means of a temperature-time model, in such a manner that when leaving the pre-pasteurization zone, the liquid and the containers have an optimum pasteurization value.

7. A process according to claim 2, wherein during the normal feed-through of containers through the pasteurizer, the temperature of the water in the receiving means in the pasteurization zone is at least kept equal to the temperature of the water in the cooling zone.

8. A process according to claim 3, wherein during the normal feed-through of containers through the pasteurizer, the temperature of the water in the receiving means in the pasteurization zone is at least kept equal to the temperature of the water in the cooling zone.

9. A process according to claim 1, wherein said liquid contained in containers is beer in a container selected from the group consisting of bottles and cans.

10. A tunnel pasteurizer for pasteurizing liquid contained in containers, comprising at least a pre-heating zone, a pre-pasteurization zone, a pasteurization zone and a cooling zone, each comprising a plurality of sprayers, there being provided in each zone receiving means for receiving water coming from the sprayers, and conveying means being arranged for feeding through, under the sprayers and above the receiving means, the containers filled with liquid to be pasteurized, and means being arranged for the heating of water, the sprayers in the pre-heating zone being connected, via conduits, to the receiving means in the pasteurization zone.

11. A tunnel pasteurizer according to claim 10, wherein switch means are arranged capable of connecting, in the case of a normal feed-through of containers through the pasteurizer, the receiving means in the cooling zone to the receiving means in the pasteurization zone, and of connecting, during a disturbed feed-through of containers through the pasteurizer, the receiving means in said cooling zone to the sprayers in the pasteurization zone.

12. A tunnel pasteurizer according to claim 11, wherein registration and control means are arranged for registering the feed-through of containers through the tunnel pasteurizer and the temperature and humidity in the tunnel pasteurizer, and for controlling, on the basis thereof, the switch means.

13. A tunnel pasteurizer according to claim 10, wherein the tunnel pasteurizer comprises a regulating device for regulating, according to a model, the feed-through speed of the containers through the pasteurizer and the temperature of the water in at least the pre-pasteurization zone, the arrangement being such that when leaving the pre-pasteurization zone, the containers and the liquid have a predetermined pasteurization value.

14. A tunnel pasteurizer according to claim 10, wherein at least the receiving means in the pasteurization zone and in the cooling zone are formed by one receptacle, means being provided for supplying, as desired, water from the receptacle to the sprayers in a zone selected from the group consisting of the pasteurization zone, the cooling zone, and both the pasteurization zone and the cooling zone.

15. A tunnel pasteurizer according to claim 11, wherein the tunnel pasteurizer comprises a regulating device for regulating, according to a model, the feed-through speed of the containers through the pasteurizer and the temperature of the water in at least the pre-pasteurization zone, the arrangement being such that when leaving the pre-pasteurization zone, the containers and the liquid have a predetermined pasteurization value.

16. A tunnel pasteurizer according to claim 12, wherein the tunnel pasteurizer comprises a regulating device for regulating, according to a model, the feed-through speed of the containers through the pasteurizer and the temperature of the water in at least the pre-pasteurization zone, the arrangement being such that when leaving the pre-pasteurization zone, the containers and the liquid have a predetermined pasteurization value.

* * * * *